(12) United States Patent
Johnson et al.

(10) Patent No.: US 7,772,732 B2
(45) Date of Patent: Aug. 10, 2010

(54) MOTOR HAVING A THRUST SYSTEM

(75) Inventors: Philip Stephen Johnson, Granite City, IL (US); Barry Monroe Newberg, Florissant, MO (US)

(73) Assignee: Emerson Electric Co., St. Louis, MO (US)

( * ) Notice: Subject to any disclaimer, the term of this patent is extended or adjusted under 35 U.S.C. 154(b) by 182 days.

(21) Appl. No.: 12/141,184

(22) Filed: Jun. 18, 2008

(65) Prior Publication Data

US 2008/0246357 A1    Oct. 9, 2008

Related U.S. Application Data

(63) Continuation-in-part of application No. 11/467,986, filed on Aug. 29, 2006.

(51) Int. Cl.
*H02K 5/16* (2006.01)

(52) U.S. Cl. ........................... 310/90; 310/89

(58) Field of Classification Search .................. 310/90, 310/89

See application file for complete search history.

(56) References Cited

U.S. PATENT DOCUMENTS

| | | | |
|---|---|---|---|
| 3,573,510 A * | 4/1971 | Otto | ........................... 384/412 |
| 3,966,278 A | 6/1976 | Lewis | |
| 4,008,928 A | 2/1977 | Abel | |
| 4,090,749 A | 5/1978 | Daniels | |
| 4,309,062 A | 1/1982 | Bischoff | |
| 4,533,260 A | 8/1985 | Andrieux | |
| 5,277,500 A | 1/1994 | Keck | |
| 6,247,223 B1 | 6/2001 | Keck | |
| 6,359,363 B1 | 3/2002 | Foerstera et al. | |
| 7,040,453 B2 | 5/2006 | Borcherding | |
| 7,091,640 B2 | 8/2006 | Borcherding et al. | |

* cited by examiner

*Primary Examiner*—Nguyen N Hanh
(74) *Attorney, Agent, or Firm*—Maginot, Moore & Beck LLP

(57) ABSTRACT

An electric motor includes a stator and a rotor having a rotor shaft with a longitudinal axis. The rotor shaft has a locating groove formed substantially continuously around the rotor shaft. The locating groove has a base and a pair of opposing sidewalls. The base is arranged substantially parallel to the axis of rotation. The pair of opposing sidewalls extends from the base wall substantially perpendicular to the axis of rotation. The motor includes a thrust system mounted on the rotor shaft, and a locator disposed in the groove for locating the thrust system in a predetermined position along the rotor shaft.

16 Claims, 8 Drawing Sheets

MOTOR HAVING A THRUST SYSTEM

CROSS-REFERENCE TO RELATED APPLICATIONS

This application is a continuation-in-part of application Ser. No. 11/467,986 filed on Aug. 29, 2006.

FIELD OF THE INVENTION

The present invention is related to motors having thrust systems.

BACKGROUND OF THE INVENTION

Prior art motors having thrust systems are often assembled using epoxy. While such motors are satisfactory, there are several disadvantages to such motors. First, epoxy application does not lend itself to "lean" manufacturing techniques. The epoxy requires several hours to cure, effectively adding those several hours to the assembly process and increasing the number of motors "in process" at any given time. The epoxy tends to have sharp edges after curing, making it more difficult to handle. Accordingly, a reliable, efficient motor construction that can eliminate the need for epoxy in the manufacturing process is needed.

SUMMARY OF THE INVENTION

In one aspect, an electric motor includes a stator and a rotor having a rotor shaft. The rotor shaft has a locating groove formed substantially continuously around the rotor shaft. The locating groove has a base and a pair of opposing sidewalls. The base is arranged substantially parallel to a longitudinal axis of the rotor shaft. The pair of opposing sidewalls extends from the base wall substantially perpendicular to the longitudinal axis. The motor includes a thrust system mounted on the rotor shaft, and a locator disposed in the groove for locating the thrust system in a predetermined position along the rotor shaft.

In another aspect, an electric motor comprises a stator and a rotor including a rotor shaft having a locating groove formed therein. The motor has an endshield disposed at an end of the rotor and stator, and a thrust system mounted on the rotor shaft. The thrust system includes a sleeve bearing retained in the endshield configured to rotatably support the rotor shaft. The motor also includes a locator disposed in the locating groove for locating the thrust system in a predetermined position. The thrust system has a spacer disposed along the rotor shaft between the bearing and the locator disposed in the locating groove. The spacer includes a retaining flange extending from a face of the spacer toward the locator and configured to at least partially surround an outer periphery of the locator disposed in the locating groove.

In still another aspect, an electric motor comprises a stator, a rotor including a rotor shaft, and a thrust system mounted on the rotor shaft. The motor has an endshield disposed at an end of the rotor and stator. The endshield includes keyhole-shaped open-ended slots for receiving fasteners to secure the endshield to the stator.

DETAILED DESCRIPTION OF THE DRAWINGS

Figure 1:
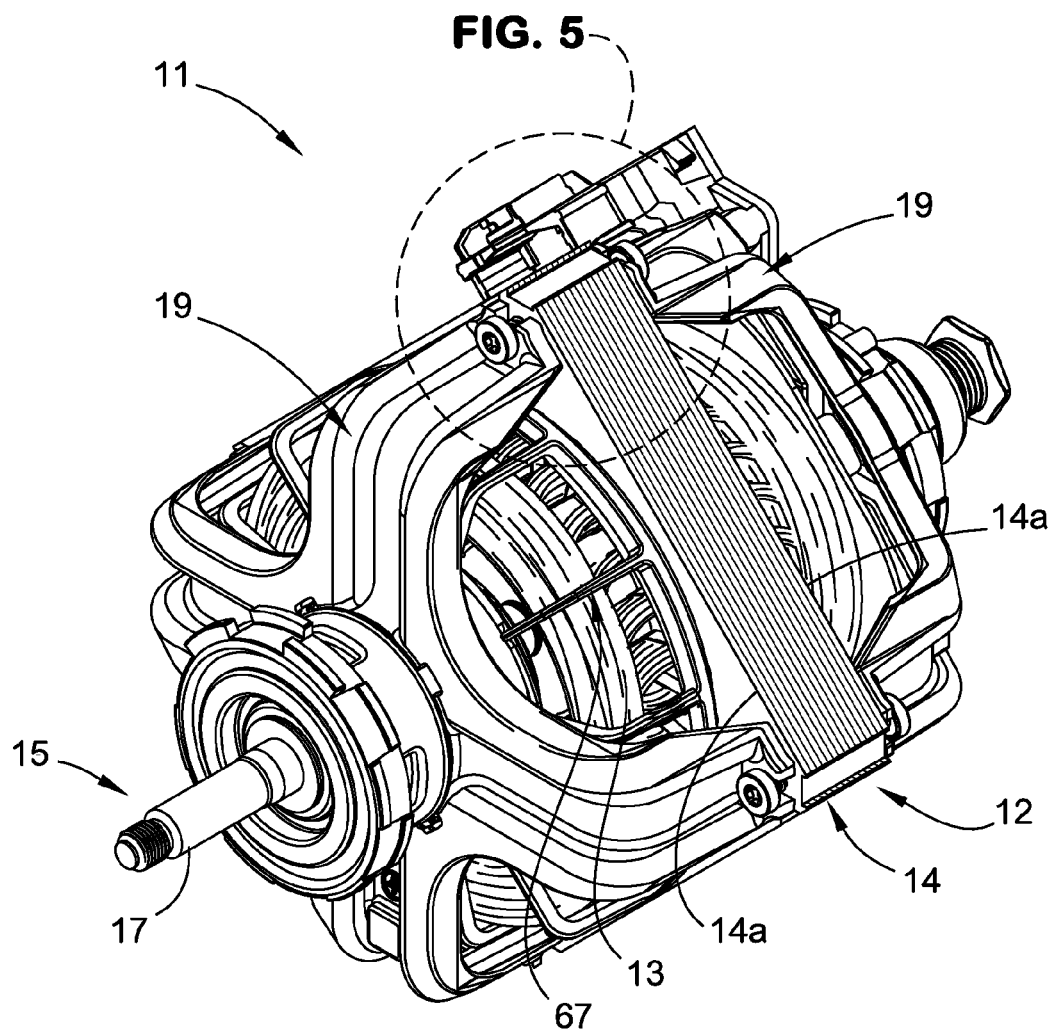
FIG. 1 is a perspective of a motor of one embodiment.
Figure 2:
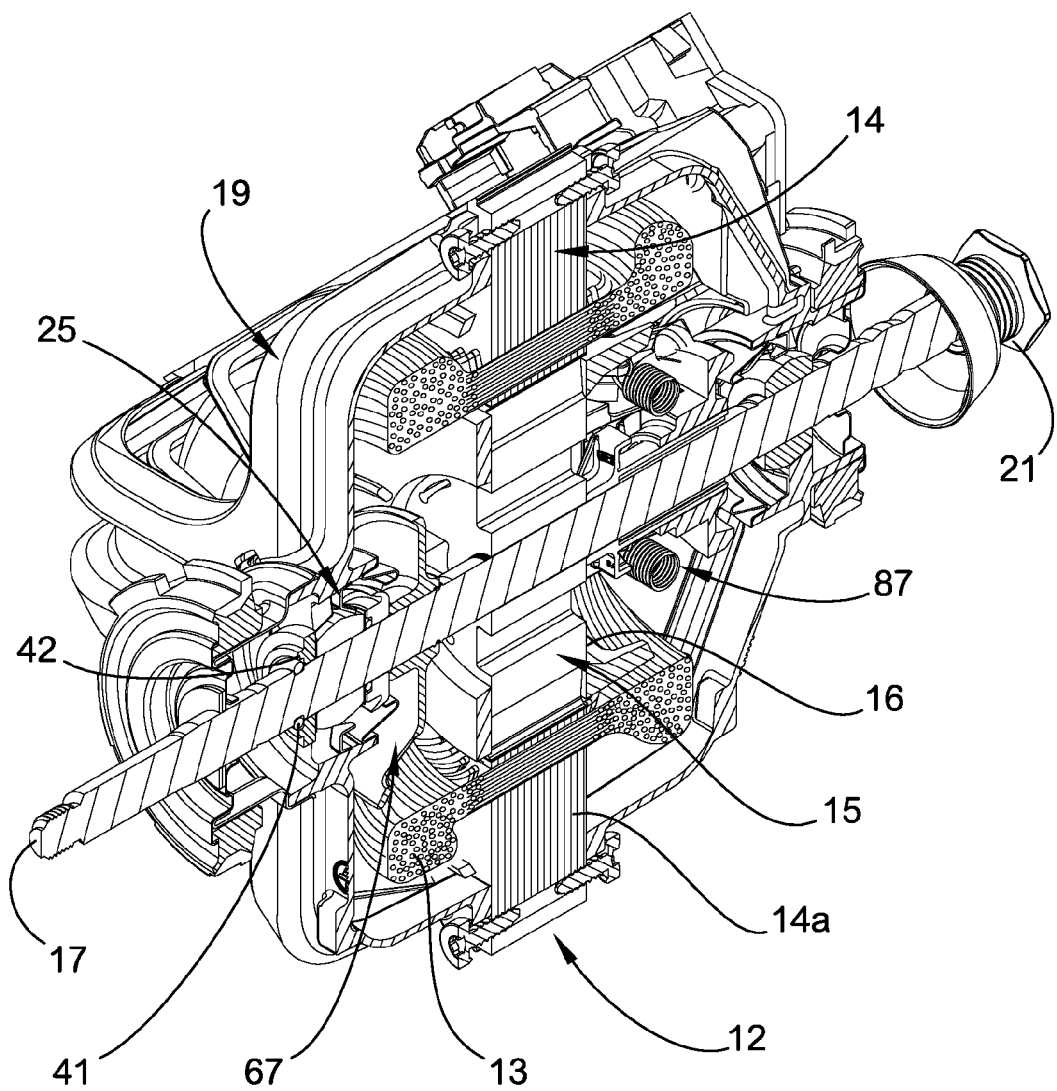
FIG. 2 is a section view of the motor.

Referring to FIGS. 1-2, a motor of one embodiment of the invention is generally designated 11. The motor generally includes a stator 12 having windings 13 and a stator core (generally designated 14) including laminations 14a. A rotor generally designated 15 is in magnetic coupling relation with the stator and has a rotor core 16 and a rotor shaft 17. The motor also includes endshields 19 secured to the stator core 14. The motor 11 may suitably be used as a dryer motor. In a dryer application, one end of the shaft has a grooved pulley 21 for mounting a belt (not shown) thereon for turning the dryer drum. Many other applications for the motor are contemplated within the scope of the invention.

Figure 3:
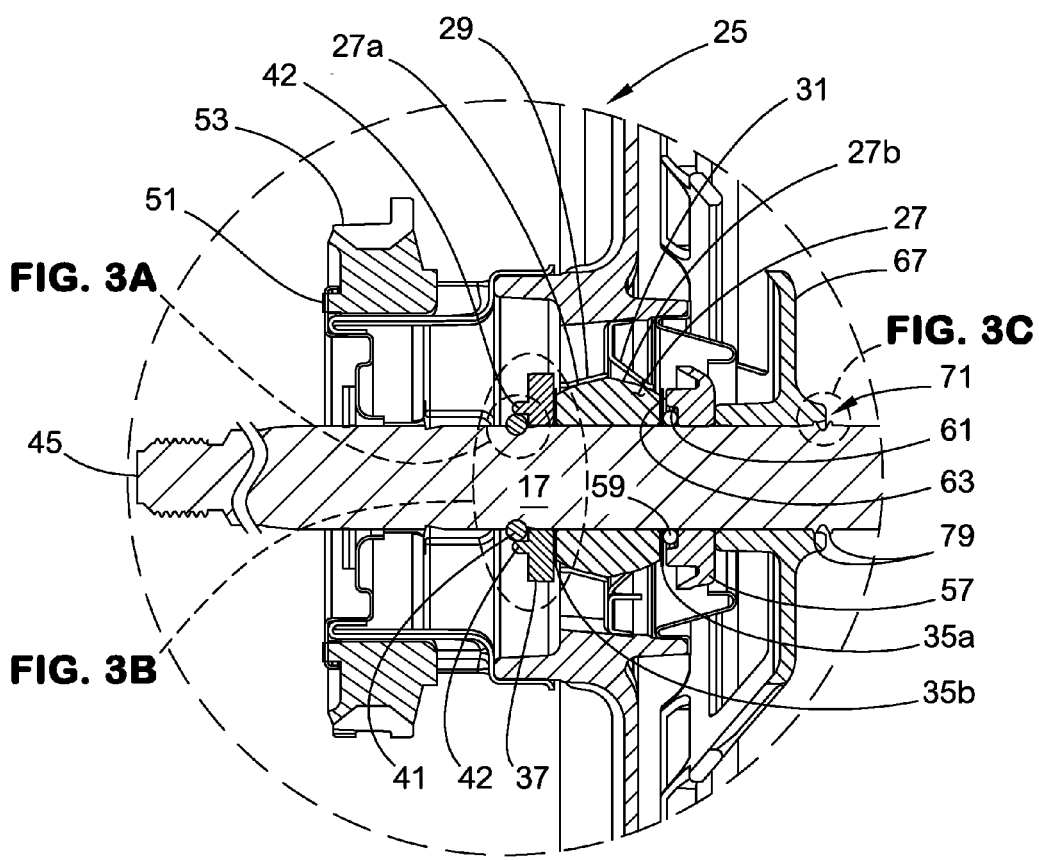
FIG. 3 is an enlarged view of a portion of FIG. 2 and showing the thrust system of this embodiment.

Referring to FIGS. 2-3, a first thrust system 25 is mounted on the rotor shaft 17. The thrust system 25 includes a sleeve bearing 27 mounted in one of the endshields 19 and received over the rotor shaft 17. The endshield 19 includes ribs 29 (sometimes referred to as "a bearing land") contacting an outward circumferential surface 27a of the bearing, and arms 31 of a retainer contacting the opposite inward surface 27b so that the bearing is captured between the ribs and the arms. The ribs 29 and arms 31 together retain the bearing 27 in the endshield 19. Note that terms such as "inward" and "outward" may be used herein for ease of description of the drawings, but such relative terms do not limit the scope of the invention. The endshield 19 is suitably a metal casting, e.g., aluminum, but might also be molded plastic, among other options. The retainer is optionally made separately from the casting.

Inward and outward washers 35a,b of the thrust system 25 are disposed on opposite sides of the bearing 27. In this embodiment, the washers are thin steel washers, e.g., of hardened steel.

A spacer 37 is disposed outward from the outward washer 35b. In this embodiment, the spacer is made of nylon and is about 0.125 inches thick. The inside diameter is sized to slide over the shaft 17, and the outside diameter is sized larger than the outward washer 35b so that in case of inward movement of the bearing relative to the shaft, such as by an impact or other inwardly directed force on the shaft, an inward face of the spacer will bear against the ribs 29 of the endshield and thereby "react out" or transfer the force through the endshield 19, rather than the bearing 27.

An outward o-ring 41 (broadly, a locator or ring) is disposed outward from the spacer 37. This o-ring 41 is received in a locating groove 43 (FIG. 3A) that is integrally formed into the shaft 17. The o-ring is suitably made of a resilient material such as rubber or the like. The inner diameter of the O-ring is sized significantly smaller than that of the full diameter shaft so that it is received in the groove 43. The o-ring may have other than a circular cross-section.

Referring to FIG. 3, the groove 43 of this embodiment is formed in the shaft a precise distance from an outward end 45 of the shaft 17. In turn, the thrust system 25 is precisely located relative to the groove (and the o-ring therein), as further described below. Alternatively, the groove 43 may be formed in the shaft without regard to the distance to the end of the shaft 17, and the thrust system simply may be precisely located relative to the groove, rather than to both the groove and the end of the shaft. In contrast, the end of the shaft may also serve as the locator. Moreover, the locator may have other configurations and may include other features in addition to or instead of the o-ring or end of the shaft.

Figure 3A:
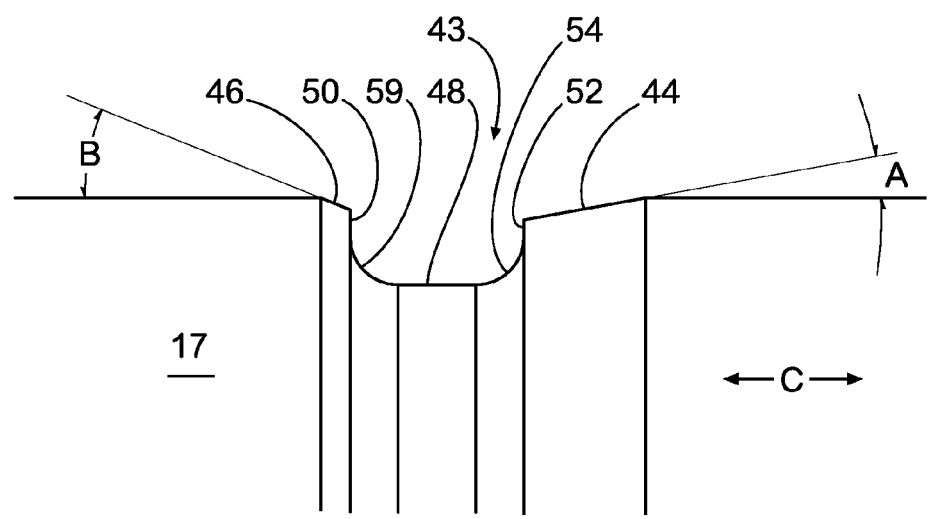
FIGS. 3A, 3B, and 3C are further enlargements.

The groove 43 extends substantially continuously around the shaft 17 and has a constant shape. The groove 43 includes an inward edge 44 that is chamfered (FIG. 3A shows the groove with the o-ring omitted), in this embodiment chamfered at an angle A of about 10°. An outward edge 46 is chamfered at a larger angle B, e.g., about 20°. Alternatively, the edges may have a radius or other constructions that smooth the edges. The chamfers (or similar constructions) are advantageous, for among other reasons, they prevent damage as the various components are assembled onto the shaft. In particular, the outward chamfer prevents damage to the o-ring as it resists axial forces.

Arranged between the inward edge and outward edges of the groove are a base wall 48 and a pair of opposing sidewalls 50, 52. The pair of opposing sidewalls includes an inward sidewall 52 extending inwardly toward the axis of the shaft from the inward edge, and an outward sidewall 50 extending inwardly toward the axis of the shaft from the outward edge. A width between the inward edge inward sidewall 52 and the outward sidewall 50 corresponds to the width of the o-ring so that the o-ring may be received in the groove (see FIG. 3B). The base wall 48 is arranged substantially parallel to the axis of the shaft and has a depth with respect to the outer circumference of the shaft 17 such that at least about 33% of the o-ring circumference is received in the groove, e.g., about 40% received. Note that the o-ring 41 is received at least about 33% in the groove exclusive of the depth of the chamfers.

To further prevent or limit movement of the o-ring in response to axial forces, the inward sidewall 52 and outward sidewall 50 each extend radially from the base so that they are substantially perpendicular to the base wall 48. The inward sidewall 52 and outward sidewall 50 are each connected to the base wall 48 by curved or rounded edges 54 so that the groove 43, exclusive of the chamfered edges, has a U-shape or rounded square cross-section as shown in FIG. 3A. The substantially vertical orientation of the sidewalls 50, 52 with respect to the base wall of the groove provides a barrier to axial movement of the locator o-ring 41 along the shaft 17.

Figure 3B:
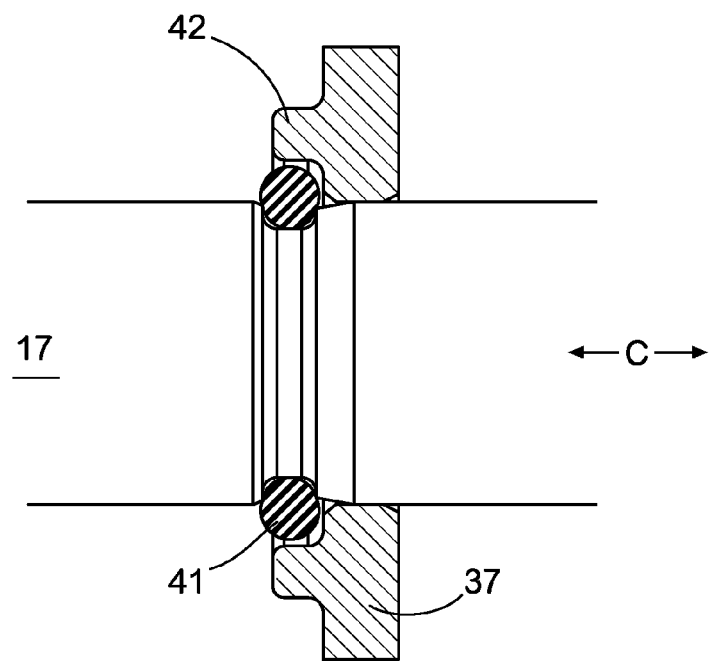

To prevent or limit radial movement of the o-ring 41 out of the groove, the spacer 37 includes a retaining flange 42 as shown best in FIGS. 3 and 3B. The retaining flange 42 may be a continuous annular protrusion on the outward face of the spacer that is positioned on the spacer to substantially surround and at least partially overhang the outermost peripheral surface of the o-ring 41. The retaining flange extends axially with respect to the shaft 17 at least halfway across the groove although the flange may overhang the o-ring by any suitable amount. The retaining flange cooperates with the groove 43 to at least partially enclose the o-ring to prevent or limit axial as well as radial movement of the o-ring. The retaining flange may be formed integrally with the spacer. The flange, however, may be formed separately from the spacer and attached in any suitable manner. Although the flange has been described as a continuous protrusion, in other embodiments, the flange may comprise a plurality of spaced protrusions that are arranged circumferentially around the o-ring on the spacer.

Referring again to FIG. 3, further outward from the o-ring is a bearing cap 51 and hub ring 53. The outward end 45 of the shaft 17 is threaded to receive a dryer blower (not shown), though other elements or no elements may be attached at the outward end.

A thrust collar 57 and inward o-ring 59 are disposed inward from the bearing opposite the inward washer 35a. The thrust collar of this embodiment is annular and includes a void 61 extending inward from its inward face 63 for receiving the inward o-ring 59. The void 61 is sized and shaped such that the o-ring 59 extends outward from the inward face 63 of the thrust collar 57 for reasons described below. Also, the void 61 is sized and shaped so that upon compression of the o-ring 59, the o-ring can be completely, or substantially completely received in the void and thereby not extend outward from the inward face, as during the assembly embodiment described below. In this embodiment, the thrust collar is made of nylon and the o-ring is made of a resilient material such as rubber.

Inward from the thrust collar, the thrust system 25 also includes a tolerance system 71 for absorbing tolerance or variance in the thrust system. The tolerance system 71 includes a portion of a fan 67 (more broadly, an innermost component) for cooling the motor 11. The fan 67 is mounted on the rotor shaft 17 and is secured in place by the tolerance system 71. The tolerance system includes a deformable portion or recess 73 extending circumferentially in a hub 74 of the fan 67. This recess 73 is formed during assembly of the motor (i.e., it is not pre-formed in the hub), and its depth D may vary to absorb tolerances or variances in the system as described below in the exemplary assembly method. The hub also includes a chamfered edge 75 pre-formed in the hub, and formed to facilitate assembly. The tolerance system 71 further includes a protrusion 79 extending from the shaft 17. In this embodiment, the protrusion 79 is an outward edge of a rolled collar 80 that is integrally formed in the shaft 17. However, many other configurations are contemplated. The recess 73 in the hub is generally formed by the protrusion 79 during assembly, the protrusion thereafter being seated in the plastically deformed hub 74.

Figure 4:
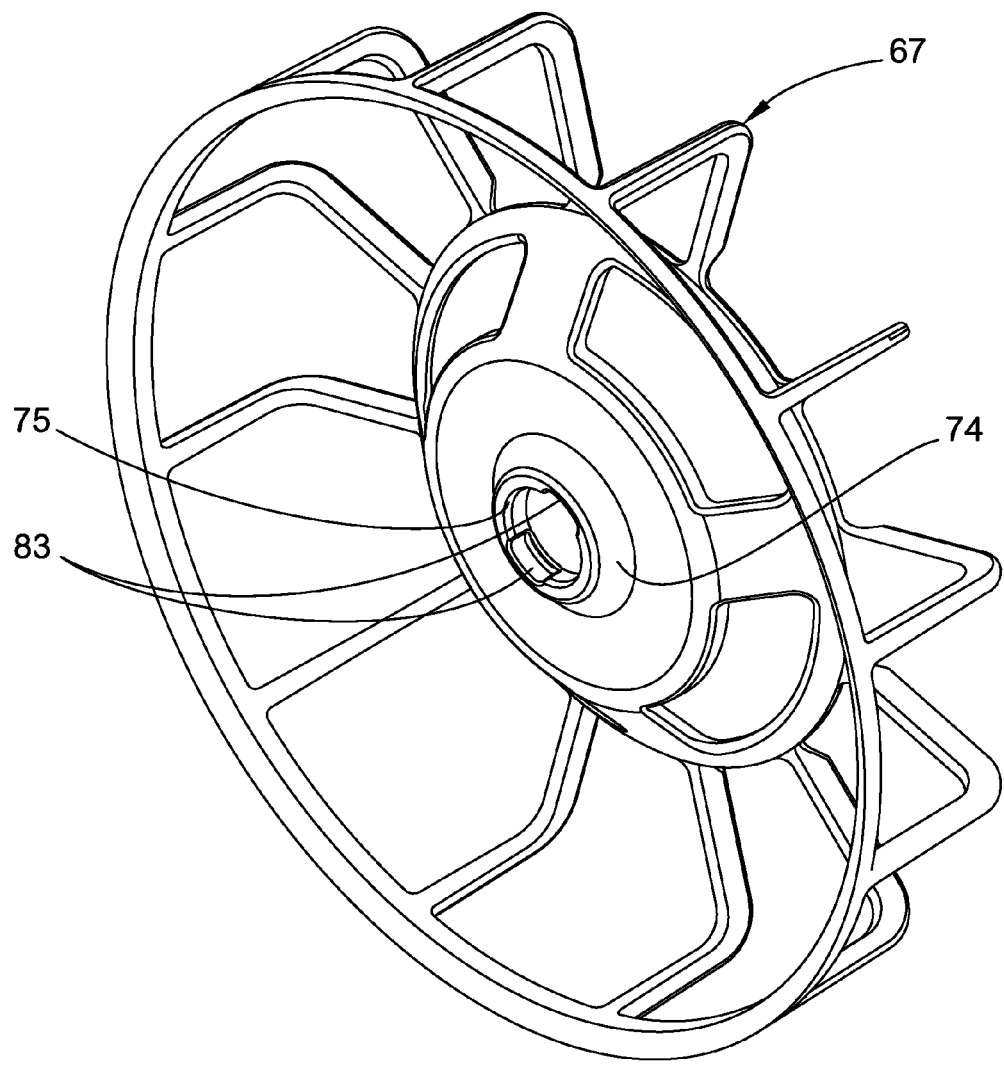
FIG. 4 is a perspective of a fan of the system.

Referring to FIG. 4, the fan hub 74 includes notches 83 (broadly, "relief") for facilitating assembly and inhibiting cracking of the hub. A solid, continuous hub might crack as it is secured over the rolled collar. Accordingly, and as shown, the hub 74 includes two of the notches 83, though other numbers of notches (e.g., 3-4) may be used. This design is superior to prior art designs wherein the hub had several ribs that functioned to retain the fan on a rolled collar or other protrusion from the shaft. However, the fan 67 is optional. The thrust collar 57 may instead include the portion of the tolerance system 71 that is presently described as being formed in the fan 67.

In one embodiment, the thrust system 25 is assembled on the shaft 17 by first sliding the hub 74 of the fan 67 over the shaft. Next, the thrust collar 57, inward o-ring 59, inward washer 35a and endshield assembly 19 (including the bearing 27) are placed on the shaft, followed by the outward washer 35b and the spacer 37. Axial inward pressure is applied on the spacer 37 to compress the inward o-ring 59 into the void 61 in the thrust collar 57.

Figure 3C:
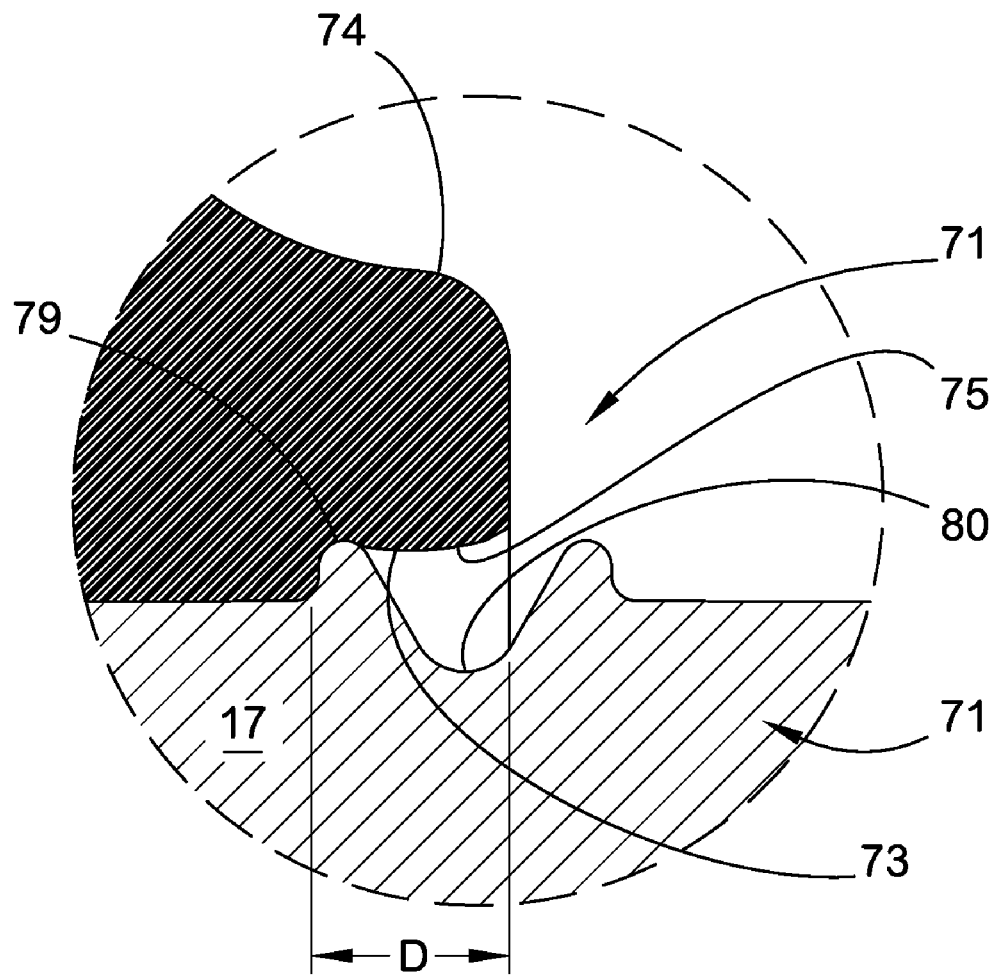

The pressure also forces the fan hub 74 into position on the protrusion 79 of the rolled collar 80 so that the recess 73 is formed. (Note: if the tolerance system is part of the thrust collar 57 instead of the fan 67 as shown, then the thrust collar is engaged with the rolled collar.) Pressure is released when the thrust system 25 is precisely positioned relative to the groove 43, and the recess then has depth D as shown in FIG. 3C. The depth D will vary depending on the location of the protrusion 79, the thickness of the fan 67, the thrust collar 57, the inward o-ring 59, the washers 35a and 35b, the endshield assembly 19 (including the bearing 27) and the spacer 37. In other words, the tolerance system 71 absorbs all the tolerance or variance in each of the aforementioned components of the motor 11 so that the thrust system 25 is precisely positioned in spite of the variance in each component.

After the pressure is released, the outward o-ring 41 is placed over the outward end of the shaft 17 (the o-ring may need to be stretched or expanded) and moved inward until it is seated in the groove 43. Upon placement of the outward o-ring 41, the thrust system 25 is disposed as shown in FIG. 3. The thrust system 25 of this embodiment allows a predetermined amount of free endplay in the shaft, e.g., less than about 0.020 inches or between about 0.002 and about 0.015 inches. The remainder of the parts to be mounted on the outward end of the shaft 17 (e.g., the dryer blower) can thereafter be mounted. Note that prior to assembly of the thrust system 25 on the shaft 17, the shaft is pressed into the rotor core 16 and a centrifugal actuator 87 (FIG. 2) is also pressed into the core on the opposite side of the core from the thrust system. In this embodiment, the thrust system 25 is disposed on the opposite side of the stator core 14 from the end of the shaft carrying the load (the grooved pulley 21 (FIG. 1) for the belt). Such placement reduces bearing temperature and generally improves the motor's reliability and service life.

Figure 5:
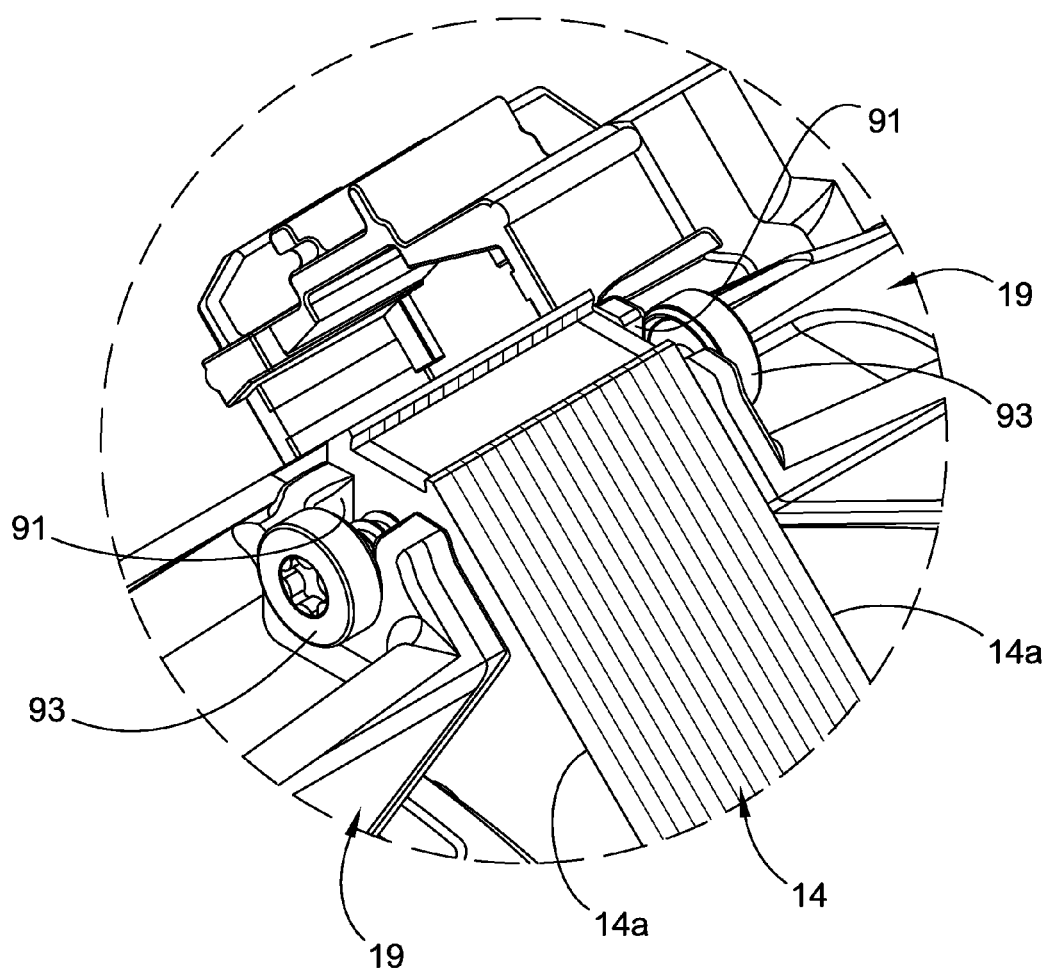
FIG. 5 is an enlarged view of a portion of FIG. 1 showing the area of fasteners connecting the endshield and the stator.

Referring now to FIG. 5, each endshield 19 includes a plurality of legs 90 that radially extend from the ribs or bearing land (not shown in FIG. 5) of the endshields. The outer ends of legs 90 have mounting tabs 92 formed thereon for engaging the end face of the stator. In previously known endshields, the outboard edges of the endshields or endshield mounting tabs may overhang the perimeter of the stator making the overhanging portion of the tab susceptible to being impacted. If there is an impact force against the prior art endshield, it may change the air gap between the stator and rotor and thereby negatively impact operation of the motor.

Figure 6:
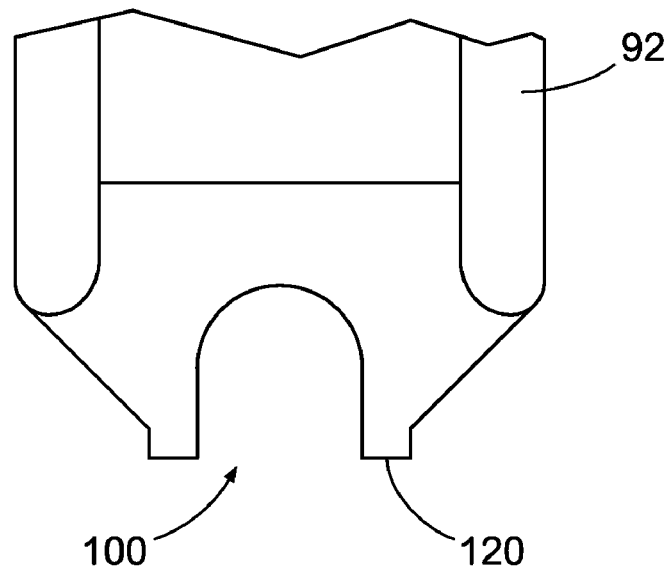
FIG. 6 is an enlarged view of a mounting tab of the endshield including a full slot.

Referring to FIG. 6, to address the issue of overhanging mounting tabs, the mounting tabs 92 of the endshields 19 have been constructed with full slots 100 for receiving fasteners 93. In this embodiment, the fasteners are screws although threaded screws, through-bolts, rivets, or other similar devices may be used. During assembly, the screws tend to pull the laminations 14a somewhat into the slots to assure a good connection. Incorporating full slots in the mounting tabs of an end shield allows the material of the mounting tab outboard of the fasteners to be "removed" so that the tab no longer overhangs the stator. In case of an impact force against the stator core 14, the endshield 19 is not impacted so as to inhibit damage to the endshield and damage to the motor.

Figure 7:
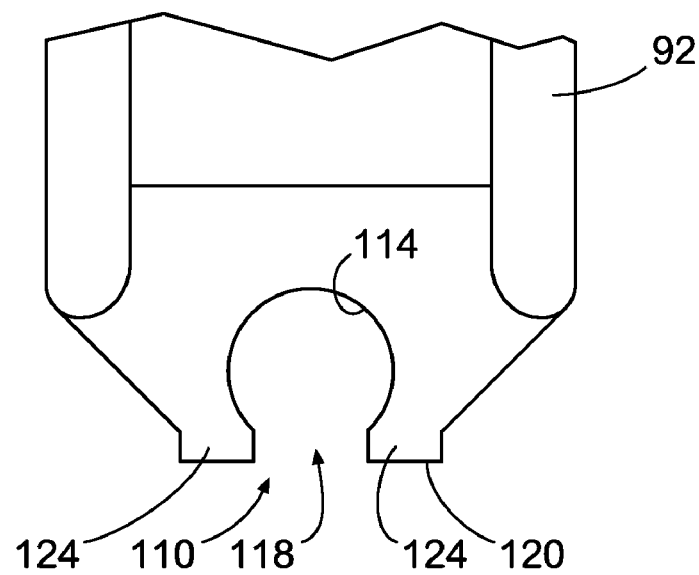
FIG. 7 is an enlarged view of a mounting tab of the endshield including a keyhole slot.

In order to provide additional support for the fasteners, the mounting tabs 92 of the end shields may be constructed with keyhole slots 110 as depicted in FIG. 7. Similar to the full slots, the keyhole slots 110 are open ended slots. In the keyhole slot embodiment, however, the outboard portion of the slot is narrower than the inboard portion. In particular, the keyhole slot includes a fastener opening 114 and a narrow slot 118 that extends from the fastener opening 114 through the outboard edge 120 of the tab. The fastener opening 114 of the keyhole slot is sized and shaped to receive a fastener such as the screws 93 depicted in FIG. 5. The narrow slot portion 118 of the keyhole slot is narrower than the fastener opening 114. The portions 124 of the mounting tab that are adjacent the narrow slot portion 118 are configured to provide additional tab material against which outboard portions of a fastener head may bear when the fastener is driven into the stator core. The narrow slot portion of the keyhole slot prevents the fastener head and upper shank of the fastener from tilting and/or breaking when the fastener is tightened into the stator core.

In one embodiment, full slots and/or keyhole slots may be formed integrally with the end shield during casting of the end shield. For example, mold features may be incorporated into an end shield mold for forming the slots in the mounting tabs of the end shields. Alternatively, the slots may be formed into the mounting tabs using a secondary process after the casting of the end shield. Any suitable method may be used to form the slots in the mounting tabs of the end shield.

Embodiments of the invention enable a leaner manufacturing process than the prior art motor. For example, manufacturing of embodiments of the motor can be done without epoxy, thereby making the manufacturing process faster, more cost effective and more precise. The new motor also enables better control of shaft extension tolerances. Further, thrust loading on the bearing face is less than or equal to that of prior art motors so that the temperature in the bearings is maintained at an acceptable level. Note that free endplay enabled by the thrust system ensures that heat cannot be generated on both bearing faces. In other words, thrust loading only occurs against one of the bearing surfaces at any given time. The thrust assembly is cheaper than those employing ball bearings, and is more precise and easier to remove than those employing PAL nuts.

The thrust assembly of some embodiments also resists impact on either end of the shaft. The spacer described above transfers impact force to the endshield so that the bearing is not unseated. The o-ring in the groove also serves to maintain the assembly in place. The o-rings on both sides also function to keep motor noise low.

Another advantage of the o-ring in groove construction is that it reduces tolerance stack-up. The groove is dimensioned precisely from the end of the shaft, and the assembly is located off the groove and o-ring. All of the thrust on the shaft is reacted out through one thrust system, rather than two thrust systems like many prior art motors. Inward thrust is reacted out through the endshield due to the spacer, and outward thrust is also reacted through the endshield. In this way, the thrust system operates to inhibit damage to the bearing and motor under an impact load or force directed in either direction along or parallel to the axis of the shaft. Also, only the tolerance in the shaft groove, the o-ring and the assembly affect free endplay. Because there is no need to bear thrust on the other side of the rotor/stator, there is significantly less tolerance stack-up. This enables a more efficient manufacturing process and precise free endplay in the thrust system. In one embodiment, the tolerance is less than 0.020 inches or even between about 0.002 and 0.015 inches.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. An electric motor comprising:
   a stator assembly including a central bore;
   a rotor assembly positioned within the central bore, the rotor assembly including a rotor shaft extending from at least one end of the bore, the rotor shaft including a locating groove formed therein, the locating groove being formed substantially continuously around the shaft, the locating groove having a base and a pair of opposing sidewalls, the base being arranged substantially parallel to a longitudinal axis of the rotor shaft, the pair of opposing sidewalls extending from the base wall substantially perpendicular to the longitudinal axis;

a thrust system mounted on the rotor shaft;

a locator at least partially disposed in the locating groove between the opposing sidewalls, the locator being located at a predetermined position along the rotor shaft to limit movement of the thrust system along the rotor shaft; and an end shield connected to an end of the stator assembly from which the rotor shaft extends, the endshield including keyhole-shaped open-ended slots for receiving fasteners to secure the endshield to the stator assembly.

2. The electric motor of claim 1, wherein the keyhole-shaped open-ended slots of the endshield are positioned on a perimeter of the endshield to enable the perimeter of the endshield to align with an outer periphery of the stator assembly when the endshield is secured to the stator assembly by the fasteners, the keyhole-shaped open-ended slots being positioned on the perimeter to limit overhang of the perimeter of the endshield beyond the outer periphery of the stator assembly.

3. The electric motor of claim 1, the thrust system including a sleeve bearing and a spacer, the sleeve bearing being received in an opening in the endshield and rotatably supporting the rotor shaft, the spacer being disposed along the rotor shaft between the bearing and the locator.

4. The electric motor of claim 3, the spacer including a retaining flange extending from a face of the spacer toward the locator and configured to at least partially surround an outer periphery of the locator.

5. The electric motor of claim 4, the spacer including an opening for receiving the rotor shaft therethrough, the retaining flange comprising an annular protrusion on the face of the spacer, the annular protrusion having an inner diameter sized to fit around the outer periphery of the locator disposed in the locating groove when the spacer is positioned on the rotor shaft.

6. An electric motor comprising:

a stator assembly including a central bore;

a rotor assembly positioned within the central bore, the rotor assembly including a rotor shaft extending from at least one end of the bore, the rotor shaft including a locating groove formed therein;

a locator disposed in the locating groove; and a thrust system mounted on the rotor shaft, the thrust system including a sleeve bearing and a spacer, the sleeve bearing being configured to rotatably support the rotor shaft, the spacer being disposed along the rotor shaft between the bearing and the locator, the spacer including a retaining flange extending from a face of the spacer toward the locator and configured to at least partially surround an outer periphery of the locator disposed in the locating groove;

the locator, spacer and sleeve bearing being configured to interact to locate the thrust system at a predetermined position along the rotor shaft.

7. The electric motor of claim 6, the spacer including an opening for receiving the rotor shaft therethrough, the retaining flange comprising an annular protrusion on the face of the spacer, the annular protrusion having an inner diameter sized to fit around the outer periphery of the locator disposed in the locating groove when the spacer is positioned on the rotor shaft.

8. The electric motor of claim 6, the locating groove being formed substantially continuously around the rotor shaft, the locating groove having a base and a pair of opposing sidewalls, the base being arranged substantially parallel to a longitudinal axis of the rotor shaft, the pair of opposing sidewalls extending from the base wall being substantially perpendicular to the longitudinal axis.

9. The electric motor of claim 8, the base and the pair of opposing sidewalls of the locating groove being connected by rounded corners.

10. The electric motor of claim 6, an endshield including keyhole-shaped open-ended slots for receiving fasteners to secure the endshield to the stator assembly.

11. The electric motor of claim 10, wherein the keyhole-shaped open-ended slots of the endshield are positioned on a perimeter of the endshield to enable the perimeter of the endshield to align with an outer periphery of the stator assembly when the endshield is secured to the stator assembly by the fasteners, the keyhole-shaped open-ended slots being positioned on the perimeter to limit overhang of the perimeter of the endshield beyond the outer periphery of the stator assembly.

12. An electric motor comprising:

a stator assembly including a central bore;

a rotor assembly positioned within the central bore, the rotor assembly including a rotor shaft extending from at least one end of the bore, the rotor shaft including a locating groove formed therein;

a thrust system mounted on the rotor shaft;

a locator at least partially disposed in the locating groove, the locator being located at a predetermined position along the rotor shaft to limit movement of the thrust system along the rotor shaft; and an endshield connected to an end of the stator assembly from which the rotor shaft extends, the endshield including keyhole-shaped open-ended slots for receiving fasteners to secure the endshield to the stator assembly;

wherein the keyhole-shaped open-ended slots of the endshield are positioned on a perimeter of the endshield to enable the perimeter of the endshield to align with an outer periphery of the stator assembly when the endshield is secured to the stator assemly by the fasteners, the keyhole-shaped open-ended slots being positioned on the perimeter to limit overhang of the perimeter of the endshield beyond the outer periphery of the stator assembly.

13. The electric motor of claim 12, the locating groove being formed substantially continuously around the shaft and having a base and a pair of opposing sidewalls, the base being arranged substantially parallel to a longitudinal axis of the rotor shaft, the pair of opposing sidewalls extending from the base wall substantially perpendicular to the longitudinal axis.

14. The electric motor of claim 12, the thrust system including a sleeve bearing retained in the endshield configured to rotatably support the rotor shaft, the thrust system including a spacer disposed along the rotor shaft between the bearing and the locator disposed in the locating groove, the spacer including a retaining flange extending from a face of the spacer toward the locator and configured to at least partially surround an outer periphery of the locator disposed in the locating groove.

15. The electric motor of claim 14, the spacer including an opening for receiving the rotor shaft therethrough, the retaining flange comprising an annular protrusion on the face of the spacer, the annular protrusion having an inner diameter sized to fit around the outer periphery of the locator disposed in the locating groove when the spacer is positioned on the rotor shaft.

16. The electric motor of claim 15, the locator comprising an elastic ring.

* * * * *